United States Patent
Ziarno et al.

(10) Patent No.: US 7,328,012 B2
(45) Date of Patent: Feb. 5, 2008

(54) AIRCRAFT COMMUNICATIONS SYSTEM AND RELATED METHOD FOR COMMUNICATING BETWEEN PORTABLE WIRELESS COMMUNICATIONS DEVICE AND GROUND

(75) Inventors: James J. Ziarno, Malabar, FL (US); Shawn Gallagher, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/158,575

(22) Filed: Jun. 22, 2005

(65) Prior Publication Data
US 2006/0183474 A1 Aug. 17, 2006

Related U.S. Application Data

(60) Provisional application No. 60/652,166, filed on Feb. 11, 2005.

(51) Int. Cl.
*H04Q 7/20* (2006.01)
(52) U.S. Cl. ............ 455/431; 455/426.2; 455/430
(58) Field of Classification Search ........ 455/431, 455/426.2, 430, 445
See application file for complete search history.

(56) References Cited

U.S. PATENT DOCUMENTS

| | | | |
|---|---|---|---|
| 4,642,775 A | 2/1987 | Cline et al. | 364/443 |
| 4,718,229 A | 1/1988 | Riley | 60/39.281 |
| 4,729,102 A | 3/1988 | Miller, Jr. et al. | 364/424 |
| 4,872,182 A | 10/1989 | McRae et al. | 375/1 |
| 4,908,618 A | 3/1990 | Baker et al. | 340/945 |
| 5,022,024 A | 6/1991 | Paneth et al. | 370/50 |
| 5,339,330 A | 8/1994 | Mallinckrodt | 375/1 |
| 5,351,194 A | 9/1994 | Ross et al. | 364/449 |
| 5,359,446 A | 10/1994 | Johnson et al. | 359/152 |
| 5,445,347 A | 8/1995 | Ng | 236/169 |
| 5,459,469 A | 10/1995 | Schuchman et al. | 342/37 |
| 5,463,656 A | 10/1995 | Polivka et al. | 375/200 |

(Continued)

FOREIGN PATENT DOCUMENTS

EP    0 407 179 A1    1/1991

(Continued)

OTHER PUBLICATIONS

Gate-Aircraft Terminal Environment Link (Gatelink)—Ground Side, ARINC Specification 632, Dec. 30, 1994.

(Continued)

*Primary Examiner*—George Eng
*Assistant Examiner*—Wesley Kim
(74) *Attorney, Agent, or Firm*—Allen, Dyer, Doppelt, Milbrath & Gilchrist, P.A.

(57) ABSTRACT

An aircraft communications system includes a wireless local area network (LAN) access point positioned within the aircraft that receives and transmits wireless communications to and from at least one portable wireless communications device. A control panel is operatively connected to the wireless LAN access point and positioned within the flight deck of the aircraft. A communications transceiver is operative with the control panel and wireless LAN access point and operative for receiving and transmitting a communications signal between the wireless LAN access point and a ground-based transceiver. Communications between the portable wireless communications device and ground-based transceiver can be controlled from the flight deck using the control panel in one non-limiting example.

30 Claims, 4 Drawing Sheets

U.S. PATENT DOCUMENTS

| | | | |
|---|---|---|---|
| 5,652,717 A | 7/1997 | Miller et al. | 364/578 |
| 5,757,772 A | 5/1998 | Thornberg et al. | 370/236 |
| 5,761,625 A | 6/1998 | Honcik et al. | 701/14 |
| 5,809,402 A * | 9/1998 | Lemme | 455/73 |
| 5,905,466 A | 5/1999 | Jha | 343/700 MS |
| 5,943,399 A | 8/1999 | Bannister et al. | 379/88.17 |
| 6,009,356 A | 12/1999 | Monroe | 701/14 |
| 6,047,165 A | 4/2000 | Wright et al. | 455/66.1 |
| 6,088,632 A | 7/2000 | Zaccaria et al. | 701/3 |
| 6,148,179 A | 11/2000 | Wright et al. | 455/66 |
| 6,181,990 B1 | 1/2001 | Grabowsky et al. | 701/14 |
| 6,195,247 B1 | 2/2001 | Cote et al. | 361/253 |
| 6,278,913 B1 | 8/2001 | Jiang | 701/3 |
| 6,308,045 B1 | 10/2001 | Wright et al. | 455/431 |
| 6,353,734 B1 | 3/2002 | Wright et al. | 455/98 |
| 6,385,513 B1 | 5/2002 | Murray et al. | 701/14 |
| 6,393,305 B1 * | 5/2002 | Ulvinen et al. | 455/563 |
| 6,676,078 B2 | 1/2004 | Cordina et al. | 244/118.5 |
| 6,721,559 B1 * | 4/2004 | Kocin et al. | 455/431 |
| 6,725,035 B2 | 4/2004 | Jochim et al. | 455/431 |
| 6,747,577 B2 | 6/2004 | Chakravarty et al. | 390/945 |
| 6,781,513 B1 | 8/2004 | Korkosz et al. | 340/539.1 |
| 6,816,087 B2 | 11/2004 | Lane | 340/945 |
| 6,965,816 B2 * | 11/2005 | Walker | 701/16 |
| 2002/0018008 A1 | 2/2002 | Wright et al. | 340/945 |
| 2003/0148735 A1 | 8/2003 | Wright et al. | 370/343 |
| 2004/0162067 A1 * | 8/2004 | Stefani et al. | 455/431 |

FOREIGN PATENT DOCUMENTS

| | | |
|---|---|---|
| GB | 2 276 006 A | 9/1994 |

OTHER PUBLICATIONS

Airlines Electronic Engineering Committee Letter 91-079/DLK-391, Apr. 5, 1991.

Gate-Aircraft Terminal Environment Link (Gatelink)—Aircraft Side, ARINC Characteristic 751, Jan. 1, 1994.

Aviation Week & Space Technology, "*Safety Board Urges Mandatory Use of FDR/CVRs in Commuter Transports,*" Avionics, p. 73, McGraw-Hill, Inc., Aug. 31, 1987.

Aviation Week & Space Technology, "*Conversion Approach Appears Flawed,*" Aerospace Business, vol. 139, No. 4, p. 48, McGraw-Hill, Inc., Jul. 31, 1993.

Electronic Engineering Times, "*Module is Result of Work With Apple—Plessey Makes Leap With Wireless LAN,*" Nov. 7, 1994.

W.R. Beckman, "*L-1011 Flight Data Recording Systems—Background, Features, Implications and Benefits,*" AIAA Aircraft Systems and Technology Conference, Los Angeles, California, Aug. 21-23, 1978, 9 pages (Exhibit 8).

ARINC Characteristic 591, "*Quick Access Recorder For AIDS System (QAR),*" Airlines Electronic Engineering Committee, Aeronautical Radio, Inc., May 18, 1972, 21 pages (Exhibit 9).

* cited by examiner

AIRCRAFT COMMUNICATIONS SYSTEM AND RELATED METHOD FOR COMMUNICATING BETWEEN PORTABLE WIRELESS COMMUNICATIONS DEVICE AND GROUND

RELATED APPLICATIONS

This application is based upon prior filed now abandoned provisional application Ser. No. 60/652,166 filed Feb. 11, 2005.

FIELD OF THE INVENTION

The present invention relates to the field of aircraft communications, and, more particularly, to aircraft air-ground communications systems and related methods.

BACKGROUND OF THE INVENTION

The tragic events that occurred on Sep. 11, 2001 created a new awareness of airborne law enforcement. Prior to Sep. 11, 2001, most government agencies believed that domestic hijacking was a thing of the past. Only thirty-three armed and trained federal air marshals (FAMs) were employed, mainly to protect selected international flights. Federal air marshals operated without the ability to communicate to outside resources because of a lack of standard law enforcement communications equipment that could be used without interfering with existing communications equipment or aircraft operations. With this knowledge, the September 11$^{th}$ terrorists targeted domestic flights that offered the least resistance.

At the present time, thousands of federal air marshals are assigned to improve aviation security by protecting commercial airlines. Unfortunately, these federal air marshals still remain isolated during flights, and do not possess the capability to communicate wirelessly and covertly with each other, with the flight crews, or with any ground-based mission operations center (MOC), for example on airline operations control center or federal air marshal service operations center. Some attempts to secure aeronautical communications for federal air marshals have focused on using SATCOM (satellite communications) links, which include Inmarsat (Aero-I and Aero-H) and Iridium. With an estimated acquisition and installation cost of about $250,000 per aircraft, these SATCOM solutions are cost prohibitive. Installation of such systems on a U.S. commercial airline fleet of nearly 8,000 aircraft would be very expensive. Yet even with this high investment, some of these solutions would fail to provide covert communications.

There have been other proposals to use an Airfone™ air-ground telephone system to assist federal air marshals in their air-ground communications, but that type of communications system is not secure and is not wireless. It also requires a federal air marshal to be tethered to a seatback telephone, jeopardizing the ability of the federal air marshal to remain undercover during flight. Other proposed satellite communications and cellular systems require expensive infrastructure and are not covert and wireless.

Other proposals are set forth in U.S. Pat. Nos. 6,676,078; 6,725,035; and 6,816,087. For example the '078 patent discloses a method and system for alerting a cockpit crew of terrorist activity. FOBs are worn by flight attendants. An antennae sending unit (ASU) is located in the passenger cabin, and a cockpit display unit (CDU) is located in the cockpit of the aircraft. The flight attendant can send an alert signal to the cockpit by sending a coded signal via the ASU to CDU, providing an alert indicator to the cockpit crew. The CDU can also send a transponder code and ACARS message to ground-based units. This system operates similar to a wireless buzzer system. It is activated by a flight attendant, even permitting an alarm to be transmitted to ground at the instigation of the flight deck crew.

In the '087 patent, a warning signal is transmitted by a portable transmitter, which is worn by a flight attendant, who actuates the transmitter to transmit a frequency that does not interfere with any existing avionics and navigational equipment of the aircraft. A receiver located in the flight deck has an audible and visual alarm that alerts the flight crew, who can actuate a radio to transmit to ground an alert signal, for example a hijacking code, on a pre-selected frequency.

The '035 patent is directed to a cellular system repeater located in an aircraft. A vertically polarized signal is emitted from cellular cell towers for operation with an aircraft.

One common problem associated with these systems is their limitation in only communicating primarily with the flight deck, and not interfacing with aeronautical resources for satisfactory air-ground communications or communications with an ICE "scrambling" aircraft, which may have been scrambled to intercept a hijacked commercial airliner. Such communications between a federal air marshal and a ground transceiver or a "scrambling" aircraft could be important to prevent a catastrophe if the scrambling aircraft pilot believes the hijacked aircraft should be targeted to prevent further catastrophes, such as occurred on Sep. 11, 2001.

SUMMARY OF THE INVENTION

In view of the foregoing background, it is therefore an object of the present invention to provide an aircraft communications system that can provide covert wireless communications between the air and ground or with a "scrambling" aircraft.

Other objects, features and advantages are provided by different non-limiting embodiments of the invention. In accordance with one non-limiting example, at least one portable wireless communications device is positioned within the aircraft, which includes typically a transceiver for transmitting and receiving communications signals, such as voice and/or data wireless communications signals. This device could be a personal digital assistant in one non-limiting example. A wireless local area network (LAN) access point is positioned within the aircraft and receives and transmits the wireless communications signals with the at least one portable wireless communications device. A control panel is operatively connected to the wireless LAN access point and positioned within the flight deck of the aircraft. A communications transceiver is operative with the control panel and wireless LAN access point and operative for receiving and transmitting the communications signal between the wireless LAN access point and a ground-based transceiver. The communications signals between at least one portable wireless communications device and ground-based transceiver are typically in one non-limiting example controlled from the flight deck using the control panel.

In accordance with another aspect, the wireless LAN access point can be formed as a communications module that is integrated within the control panel. The communications transceiver can also be operative for communicating with a scrambling ICE aircraft. The communications transceiver can also be operative at a frequency selected by the flight deck crew, and operative in the HF, VHF or UHF bands. The communications transceiver can also be operable for satellite communications.

In yet another aspect, a mission operations center (MOC), for example, an airline operations control center can receive and transmit the communications signal to and from the communications receiver positioned on the aircraft. The MOC could be a federal air marshal service operations center which can be operative in communication with the aircraft or airline operations control center for communicating with a user of the portable wireless communications device positioned within the aircraft. The control panel typically could include an aural or visual alert indicative of a wireless transmission from a portable wireless communications device to alert the flight crew of a communication.

In another aspect, a portable wireless communications device and wireless LAN access point are operative for transmitting and receiving encrypted Voice over Internet Protocol (VoIP) wireless communications signals. The portable wireless communications device can also include an identification security circuit that allows operation of the communications device only when a user is correctly identified. For example, the identification security circuit could be operative for identifying a legitimate user using biometrics, a smartcard ID or personal identification number (PIN). The communications transceiver can also be operative for transmitting and receiving on a VHF channel from about 118 to about 135 MHz, typically in the range used by aircraft for air-to-ground communications.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
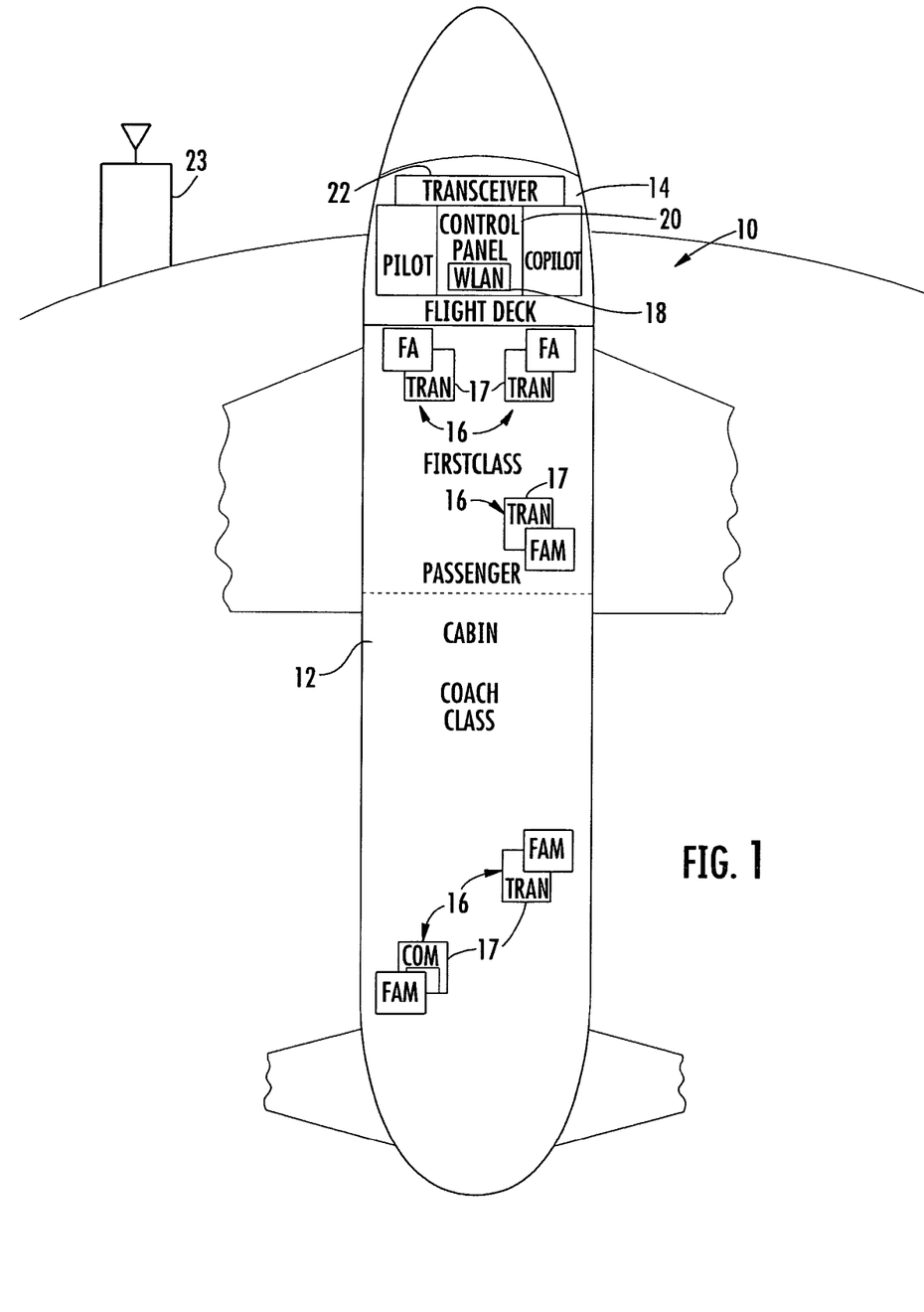
FIG. 1 is a schematic plan view of an aircraft interior showing the location of federal air marshals and flight attendants, each having portable wireless communications devices in communication with a wireless local area network (LAN) access point as part of a control panel in the flight deck.

FIG. 1 shows the interior of an aircraft 10 with a passenger cabin 12 and flight deck 14, and showing the location of several federal air marshals and flight attendants indicated by the reference designation FAM or FA. Each illustrated federal air marshal and flight attendant carries with them a portable wireless communications device 16 having a transceiver 17 for transmitting and/or receiving wireless communications signals. In one non-limiting example, the portable wireless communications device 16 could be a personal digital assistant (PDA), such as a Hewlitt Packard IPAQ 6300 series device as a non-limiting example. These and similar PDA devices are operative with a wireless local area network (WLAN) system, the Global System for Mobile communications (GSM), and General Packet Radio Service (GPRS) as non-limiting examples. Other networks and systems could be used.

As illustrated in FIG. 1, a wireless local area network (LAN) access point 18 is positioned within the aircraft and receives and transmits wireless communications signals with the portable wireless communications devices 16 and also provides local area network (LAN) capability. In one non-limiting example, a control panel 20 is operatively connected with the wireless LAN access point 18, and positioned within the flight deck 14 of the aircraft 10 and controlled by a flight deck crew.

This control panel 20 in one non-limiting example can be part of the audio control panel as the standard equipment located between the pilot and co-pilot, although other areas of the flight deck 14 can have the control panel positioned therein.

An air-ground communications transceiver 22, for example, an ARINC transceiver that is common to many commercial aircraft, is operative with the control panel 20 and wireless LAN access point 18 and operative for receiving and transmitting a communications signal between the wireless LAN access point and a ground-based transceiver 23, for example, as part of a mission operations center. In one non-limiting example, communications between a portable wireless communications device 16 in the aircraft and a ground-based communications receiver can be controlled by the flight crew from the flight deck 14 through the control panel 20, although this control from the flight deck is not necessary.

The system and method, in one non-limiting example, provides covert, wireless communications capability and can use encrypted and wireless Voice over Internet Protocol (VoIP) communications from any position in the passenger cabin 12 to other on-board federal air marshals, flight attendants or other crew members that carry the portable wireless communications devices, or ground-based personnel positioned at a mission operations center, for example an airline operations control center 30, which can communicate either through a wireless LAN line, telephone or other known communications system to a federal air marshal service operations center as a MOC 32 (FIG. 2) in this non-limiting example.

Figure 2:
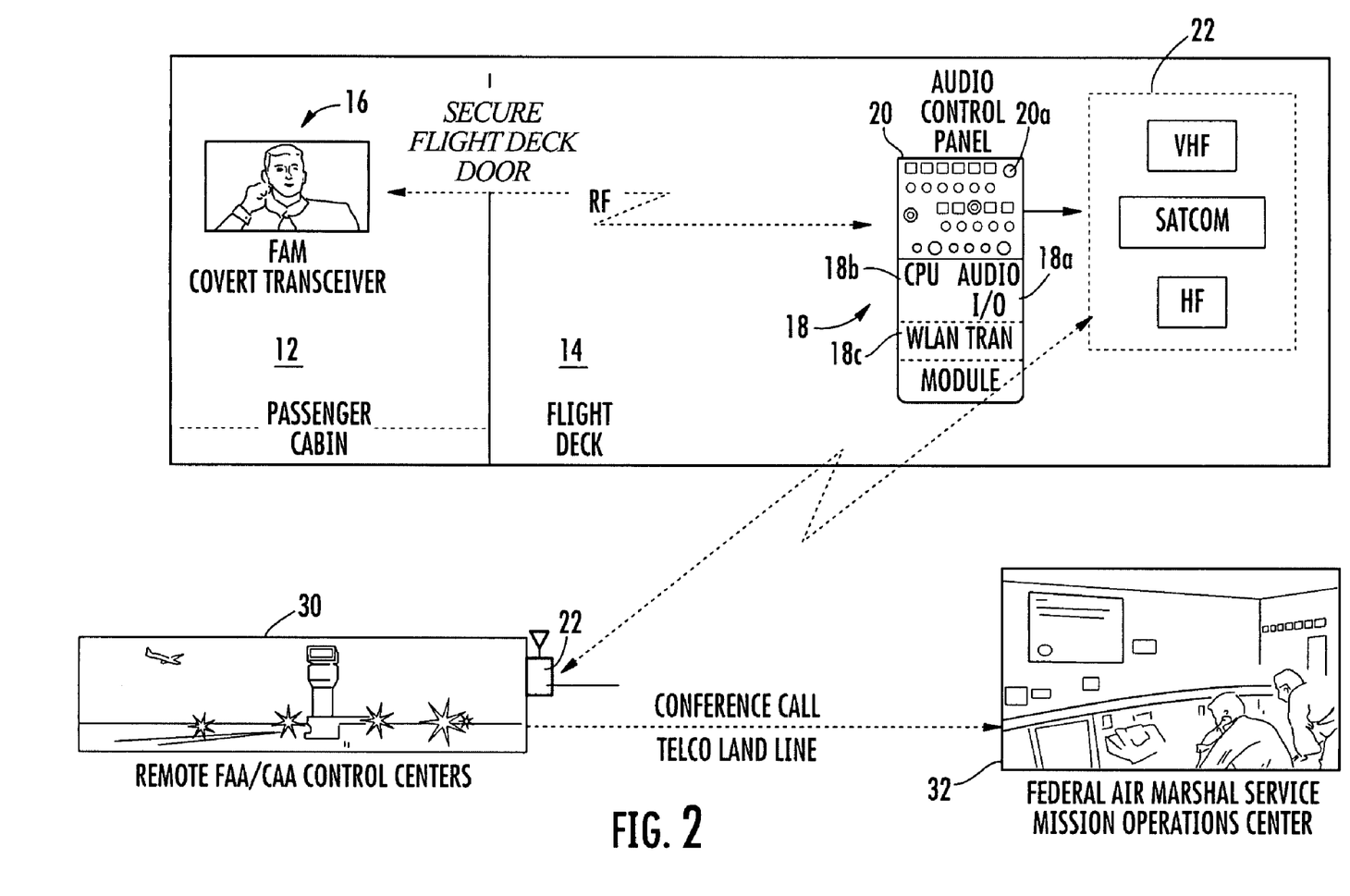
FIG. 2 is a block diagram of an aircraft communications system showing basic components of a portable wireless communications device, wireless local area network (LAN) access point, control panel, communications transceiver, airline operations control center and federal air marshal service operations center, as a non-limiting example of the present invention.

The wireless LAN access point 18 can be formed as a communications module that is integrated within the control panel. Typically, with this architecture, the communications module can be installed in an aircraft during routine overnight maintenance operations, without requiring that the aircraft be removed from service. The wireless LAN access point 18 can also be formed as a wireless and covert transceiver module, and can include circuitry for audio input and output 18*a*, a central processing unit 18*b* and a WLAN transceiver 18*c* as shown in FIG. 2. The communications module can also include any headset connections, ground connections, and microphone push-to-talk (PTT) circuit that would be operative with a portable wireless communications device, which could be operative as a half-duplex communications device.

Figure 3:
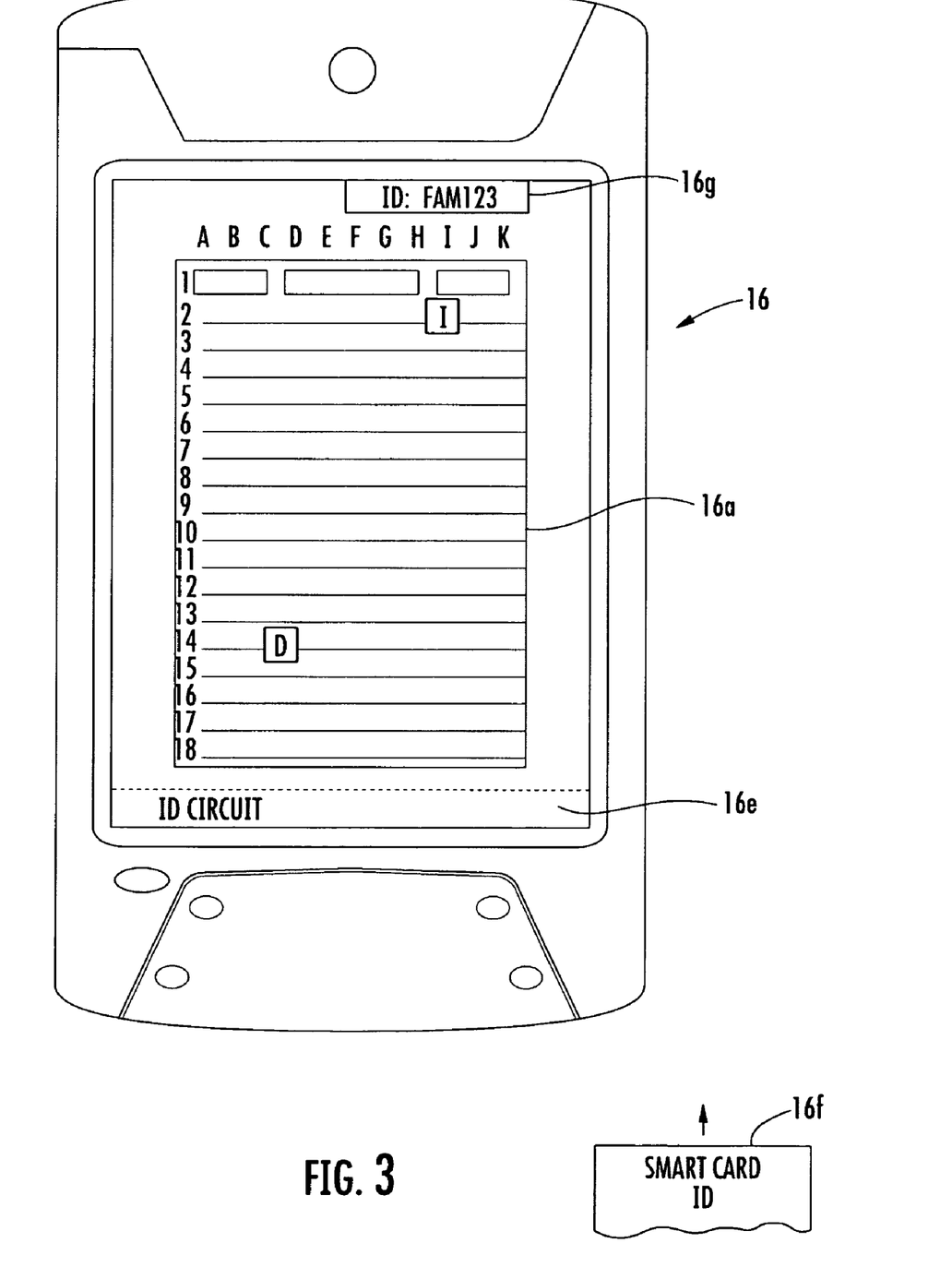
FIG. 3 is a front elevation view of a personal digital assistant (PDA), which includes a display for indicating an aircraft interior and identification security circuit to allow operation of the portable wireless communications device only when a user is correctly identified.

It should be understood that the portable wireless communications device 16 is not limited to a personal digital assistant (PDA), but the PDA technology offers advantages such as a viewer screen, for example, an LCD screen 16*a*, in which the interior layout of the aircraft can be set forth and the position of other federal air marshals displayed as illustrated in FIG. 3, showing the row number and seat letter in which the other marshals are located. Also, a personal digital assistant with video, voice, or data capability could permit different communications to occur between federal air marshals and the federal air marshal service mission operations center 32.

The communications transceiver 22, in one non-limiting aspect, could be an ARINC transceiver operative at VHF, but it should be understood that the transceiver 22 could be operative at HF, VHF, UHF or other frequencies, and can operate at necessary SATCOM frequencies. In some embodiments, there could be two pigtail connectors that could allow plugging into a headset and microphone jack. The communications transceiver also may be operative at a frequency selected by the flight deck crew so that any communications between the federal air marshal, flight attendant or other individual using the portable wireless communications device would not interfere with other aircraft communications. The WLAN transceiver 18*c* as part of the WLAN access point 18 could interface with an ARINC interface as part of the transceiver 22. In one non-limiting example, communications could occur along an Aeronautical Operational Control (AOC) VHF channel of about 118.00 to about 135.00 MHz.

Figure 4:
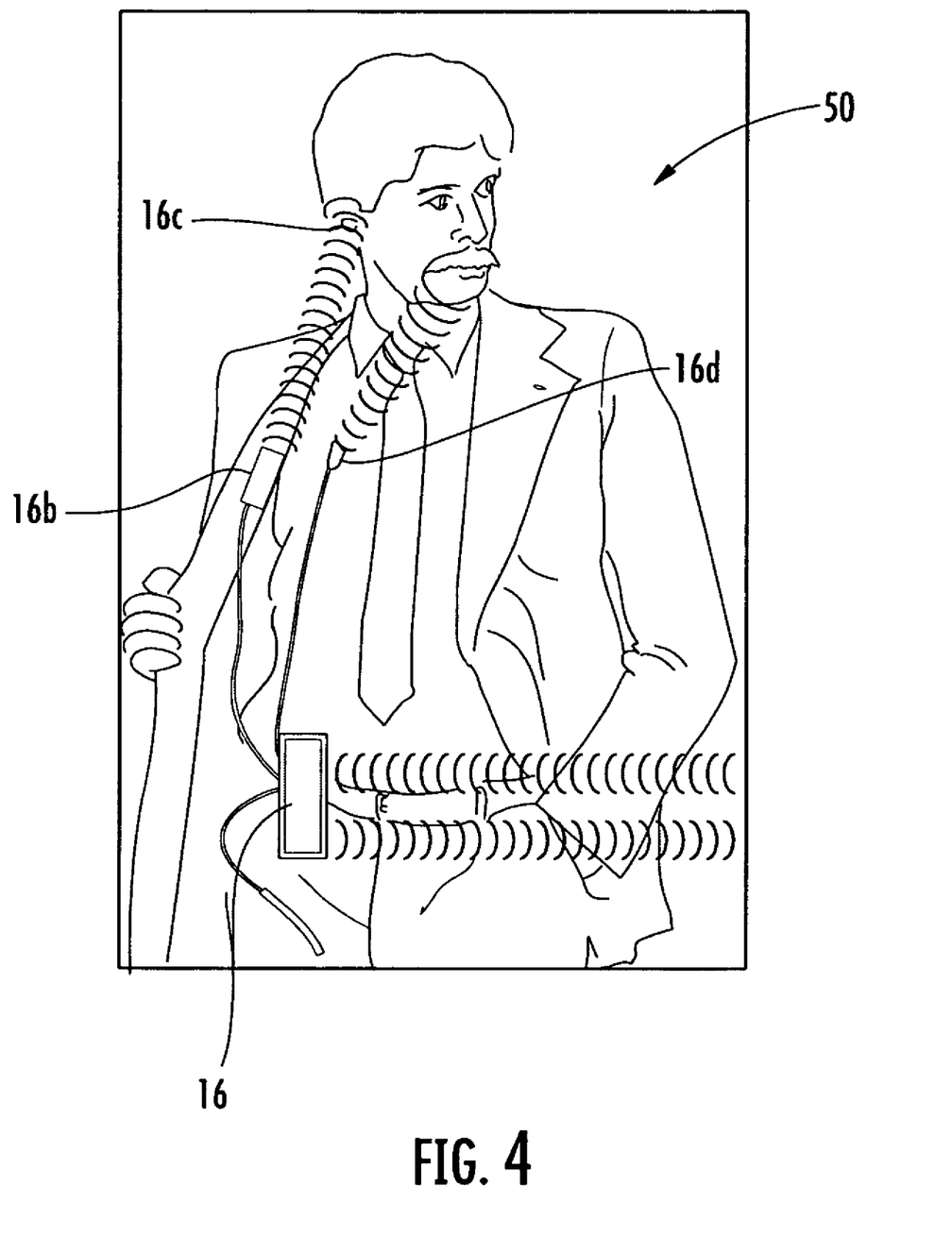
FIG. 4 is an example of an individual wearing a portable wireless communications device as a PDA that could be used as a non-limiting example of the invention.

In one aspect, any federal air marshal, flight attendant or other individual using the portable wireless communications device 16 can have situational awareness such as by a display of a passenger cabin layout as shown in FIG. 3 or by data or voice communication with other air marshals or the MOC. The portable wireless communications device 16 could be a Bluetooth device, and can include a wireless earbud for covert operations. It could operate in a half-duplex mode and have a push-to-talk (PTT) circuit. A user of the portable wireless communications device 16 could take command of the voice channel, placing the device in a transmit mode. Examples of such devices as described could be the PDA, but could also be a pen with a button at an end or a wired microphone up the sleeve, and even operative with a PDA device. FIG. 4 illustrates a federal air marshal 50 having the portable wireless communications device 16 mounted on the hip, and connected into a small transmitter 16*b* that transmits signals to a covert earbud 16*c*. A covert microphone jack 16*d* allows voice signaling.

Additionally, if flight attendants are to be issued any of the portable wireless communications devices 16, for security purposes, each device can include an identification security circuit 16*c* (FIG. 3), which permits operation of the device 16 only when a user is correctly identified. This identification security circuit 16*e* could be operative by biometrics, a smartcard ID 16*f* or personal identification number (PIN) input.

The communications transceiver 22 and control panel 20 could be operative such that manual intervention from a flight crew would be required. The crew members could be notified using an aural or visual alert 20*a* on the control panel 20 (FIG. 2), indicative that a wireless transmission has been generated from a portable wireless communications device 16, thus connecting the wireless LAN access point 18 into communication between the communications transceiver 22 and communications device 16 and selecting an appropriate communications frequency such as about 118 to about 135 MHz on a VHF channel. It should be understood that selected users of the portable wireless communications devices, for example, a federal air marshal, may have automatic system control, allowing communications between the portable wireless communications device 16 and ground-based transceiver to be automatically implemented, for example, through the control panel without flight crew actuation or other involvement, as one non-limiting example.

In another non-limiting example, a federal air marshal communicating from the portable wireless communications device 16 could ask crew members at the flight deck to tune to a specific frequency, such as 128.15 MHz in the VHF band as a non-limiting example. These communications could be monitored by a flight dispatcher on an emergency communications channel, and/or monitored by the Federal Aviation Administration (FAA). Depending on the system design, there could be a requirement for manual flight crew intervention to setup an air-to-ground communication with a federal air marshal on-board the aircraft. In other embodiments as explained above, this may not be necessary in order to obtain a voice path.

It should also be understood that any headset and microphone used with a portable wireless communications device 16, and any electrical interfaces, could be defined by the FAA Technical Standards Order (TSO) C57 or C58, which sets forth the impedances, and transmit and receive elements of a desired aircraft communications system. Also, it is possible that each portable wireless communications device 16 could have a selected calling address such as the displayed ID block 16*g* on the PDA screen, permitting a federal air marshal to be called directly by another federal air marshal (or other user) or by the MOC, similar to calling a conventional telephone number. It is also possible that the specific number identifying a portable wireless communications device can be broadcast over a terrestrial communications network and the specific communications device in the aircraft could emit a visual or audible alert to the user, indicating that communications with the user is desired.

In one non-limiting example, it is also possible that the communications transceiver is operative for communicating with a scrambling aircraft, such as a scrambling Immigration and Customs Enforcement (ICE) aircraft, which has been sent to intercept a hijacked aircraft on which the federal air marshal or flight attendant using the portable wireless communications device is stationed. As a result, the covert communications become even more necessary, and a secure high-speed wireless network communications link between the federal air marshals and the "scrambling" ICE aircraft is desired. It should be understood minimal covert communications are desirable in most scenarios, but communications with a scrambling aircraft require even greater security. For example, in a non-limiting example, secure Type 1 encrypted wireless network communications are desired, such as by using the SecNet 11 family of products provided by Harris Corporation of Melbourne, Fla.

SecNet 11 devices can include a wireless bridge for wireless infrastructure support and wired network access, including Type 1 encrypted secured wireless LANs (SW-ALs). Other devices that could be used include a SecNet 11 or SecNet 11. Plus PC card, which could be connected into a portable or fixed computer. These types of cards are Type 1 encrypted, wireless network interface cards that are NSA certified for up to and including any type of encrypted and secret information. For example, some wireless bridges could be used to provide independent communications networks within an aircraft, or operate as a single network and enable Type 1 secure point-to-wireless communication. A wireless bridge can also be configured as a wireless access point to provide connectivity for different wireless communications devices and other SecNet 11 wireless stations, such as PC cards converted into portable computers. This can enable communication between wired networks and other users and wireless stations.

Wireless networks can also extend from the aircraft if necessary, and multiple bridges can be configured as access points and placed throughout the aircraft. It is also possible to use wireless network roaming and a 10-based-T Ethernet (803.3) network connection configurations, different login configurations, and communications with a web-based browser or SNMP. Some devices could be formed with a PCMCIA form factor and communicate by encrypting the data (COMSAT) and using source and destination addresses (NETSUC). Communications can also be based on IEEE 801.11(b) Standards and part of the NSA Commercial COMSAT evaluation program (CCEP). Additionally, besides NSA Type 1 encryption algorithms, such as BATON, for communicating secret level data or Voice over IP (VoIP) and video, systems can be combined with the encryption and spread spectrum circuits, for example the Harris Sierra 1 Encryption Module and Intersil Prism Chipset. The system could also be operative at the 2.4 GHz ISM band and use ad-hoc and infrastructure modes with different operating system (OS) platform support and Windows versions. Additional operating system drivers such as Windows XP, Pocket PC and Linux could be used.

It is clear that the system as described has many components and can include selective calling of federal air marshals, flight attendants, or other users of the portable wireless communications device and allow communication between the ground and air, such as with a mission operations center (MOC) as part of the airline operations control center or federal air marshal service mission operations center such as located in Reston, Va. The system can provide an interface to the Homeland Security Surveillance Detection System (SDS), and include data and video applications. For example, even with the more conventional VHF communications at low bit rate communications, driver licenses or other more limited information could be easily uploaded. Encrypted voice over Internet Protocol (VoIP) communications would be typical, providing covert communications. The system is also operative as a frequency translator, and can use a half-duplex baseband audio interface to any existing aircraft communications systems such as described before, including any HF, VHF, UHF and global satellite communications systems on an aircraft. Selective calling can occur of federal air marshals from mission operations center.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An aircraft communications system comprising: at least one portable wireless communications device positioned within the aircraft, including a transceiver for transmitting and receiving wireless communications signals; a wireless local area network (LAN) access point positioned within the aircraft that receives and transmits wireless communications signals with the at least one portable wireless communications device; a control panel operatively connected to the wireless LAN access point and positioned within the flight deck of the aircraft and controlled by a flight deck crew wherein said wireless LAN access point is integrated within said control panel; and a communications transceiver operative with the control panel and wireless LAN access point and operative for receiving and transmitting a communications signal between the wireless LAN access point and a ground based transceiver, wherein said control panel further comprises an aural or visual alert circuit operative to indicate that a user of the at least one portable wireless communications device is transmitting a signal to the wireless LAN access point and desires communication with a crew member of the flight deck and a push-to-talk circuit operative for initiating communication between a user of the at least one portable wireless communications device and flight deck, wherein communications between the at least one portable wireless communications device and ground based transceiver through the wireless LAN access point is actuated after activation of the visual alert circuit and push-to-talk circuit at the control panel within the flight deck.

2. An aircraft communications system according to claim 1 wherein said wireless LAN access point comprises a communications module that is integrated within said control panel.

3. An aircraft communications system according to claim 1 wherein said communications transceiver is operative for communicating with a scrambling ICE aircraft.

4. An aircraft communications system according to claim 1 wherein said communications transceiver is operative at a frequency selected by a flight deck crew.

5. An aircraft communications system according to claim 1 wherein said communications transceiver comprises one of a HF, VHF or UHF transceiver.

6. An aircraft communications system according to claim 1, and further comprising a ground-based mission operations center that receives and transmits a communications signal to and from the communications transceiver positioned on the aircraft.

7. An aircraft communications system according to claim 6, wherein the mission operations center comprises one of a federal air marshal service operations center or airline operations control center.

8. An aircraft communications system according to claim 1 wherein said control panel includes an aural or visual alert indicative of a wireless transmission of a communications signal from at least one portable wireless communications device.

9. An aircraft communications system according to claim 1 wherein the at least one portable wireless communications device and wireless LAN access point are operative for transmitting and receiving encrypted Voice over Internet Protocol (VoIP) wireless communications signals.

10. An aircraft communications system according to claim 1 wherein the at least one portable wireless communications device includes an identification security circuit that allows operation of the portable wireless communications device only when a user has been correctly identified.

11. An aircraft communications system according to claim 10 wherein said identification security circuit is operative for identifying a legitimate user using biometrics, a smartcard ID or personal identification number (PIN).

12. An aircraft communications system according to claim 1 wherein said communications transceiver is operative for transmitting and receiving on a VHF channel from 118 to 135 MHz.

13. An aircraft communications system according to claim 1 wherein the at least one portable wireless communications device comprises a personal digital assistant (PDA).

14. An aircraft communications system comprising: a wireless local area network (LAN) access point positioned within the aircraft that is adapted to receive and transmit wireless communications signals with at least one portable wireless communications device; a control panel operatively connected to the wireless LAN access point and positioned within the flight deck of the aircraft and controlled by a flight deck crew wherein wireless LAN access point is integrated within said control panel; and a communications transceiver operative with the control panel and wireless LAN access point and operative for receiving and transmitting a communications signal between the wireless LAN access point and a ground-based transceiver for allowing air-to-ground communications, wherein said control panel further comprises an aural or visual alert circuit operative to indicate that a user of the at least one portable wireless communications device is transmitting a signal to the wireless LAN access point and desires communication with a crew member of the flight deck and a push-to-talk circuit operative for initiating communication between a user of the at least one portable wireless communications device and flight deck, wherein communications between the at least one portable wireless communications device and ground based transceiver through the wireless LAN access point is actuated after activation of the visual alert circuit and push-to-talk circuit at the control panel within the flight deck.

15. An aircraft communications system according to claim 14 wherein said wireless LAN access point comprises a communications module that is integrated within said control panel.

16. An aircraft communications system according to claim 14 wherein said communications transceiver is operative for communicating with a scrambling ICE aircraft.

17. An aircraft communications system according to claim 14 wherein said communications transceiver is operative at a frequency selected by a flight deck crew.

18. An aircraft communications system according to claim 14 wherein said communications transceiver comprises one of a HF, VHF or UHF transceiver.

19. An aircraft communications system according to claim 14, and further comprising a mission operations center that receives and transmits a communications signal to and from the communications transceiver positioned on the aircraft.

20. An aircraft communications system according to claim 19, wherein the mission operations center comprises one of a federal air marshal service operations center or an airline operations control center.

21. An aircraft communications system according to claim 14 wherein said control panel includes an aural or visual alert indicative of a wireless transmission of a communication signal from the at least one portable wireless communications device.

22. An aircraft communications system according to claim 14 wherein said communications transceiver is operative for transmitting and receiving on a VHF channel from 118 to 135 MHz.

23. An aircraft communications system according to claim 14, wherein said WLAN access point is operative to transmit and receive communications signals in accordance with a Voice over Internet Protocol (VoIP).

24. A method of communicating between an aircraft and ground, which comprises: transmitting a communications signal between a wireless local area network (LAN) access point positioned within the aircraft and at least one portable wireless communications device positioned within the aircraft; transmitting the communications signal between a ground-based communications transceiver and a communications transceiver on the aircraft that is operatively connected to the wireless LAN access point; and controlling the communications signals to and from the portable wireless communications device and the ground-based transceiver and the communications transceiver on the aircraft through a control panel located in the flight deck that includes the wireless LAN access point integrated therein, wherein said control panel further comprises an aural or visual alert circuit operative to indicate that a user of the at least one portable wireless communications device is transmitting a signal to the wireless LAN access point and desires communication with a crew member of the flight deck and a push-to-talk circuit operative for initiating communication between a user of the at least one portable wireless communications device and flight deck, wherein communications between the at least one portable wireless communications device and ground based transceiver through the wireless LAN access point is actuated after activation of the visual alert circuit and push-to-talk circuit at the control panel within the flight deck.

25. A method according to claim 24 and which further comprises integrating the wireless LAN access point within the control panel as a communications module.

26. A method according to claim 24 and which further comprises communicating with a scrambling ICE aircraft.

27. A method according to claim 24 and which further comprises communicating with a ground-based mission operations center.

28. A method according to claim 24 and which further comprises indicating a wireless transmission of a communications signal from a portable wireless communications device on the aircraft by indicating an aural or visual alert at the control panel in the flight deck.

29. A method according to claim 24 and which further comprises transmitting the communications signal between the wireless LAN access point and the wireless communications device using Voice over Internet Protocol (VoIP).

30. A method according to claim 24 and which further comprises identifying a user of the wireless communications device using at least one of biometrics, a smartcard ID or personal identification number (PIN).

* * * * *